April 19, 1966   W. S. RICHARDSON   3,246,726
OVERRUNNING CLUTCH
Filed Feb. 24, 1964   4 Sheets-Sheet 1
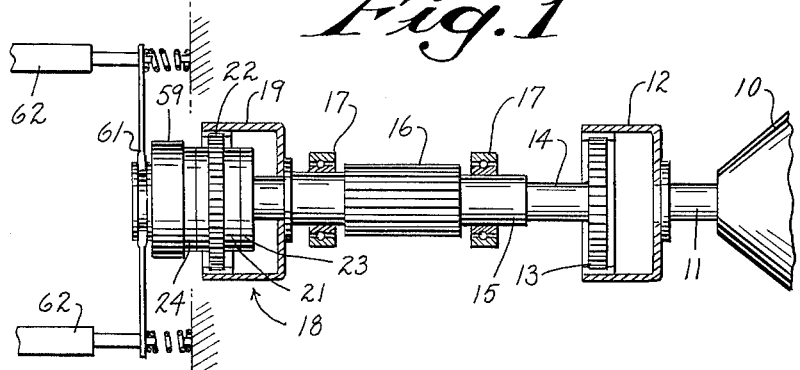
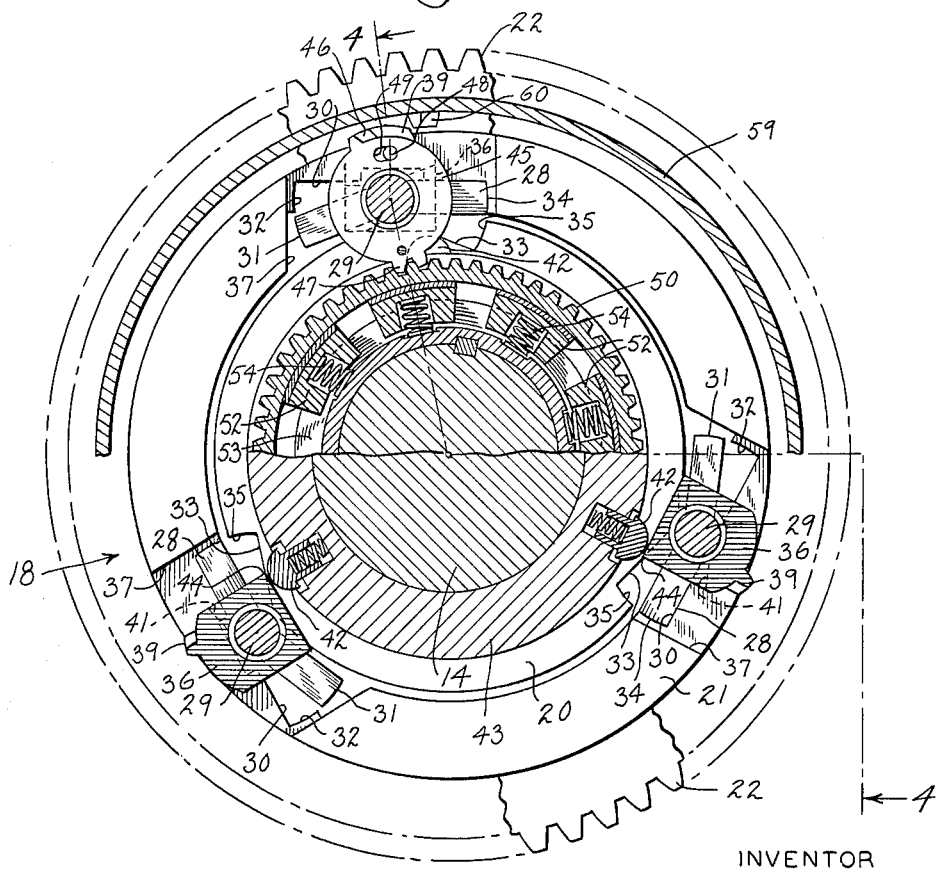
INVENTOR
WILLIAM S. RICHARDSON
BY *Thomas W. Ehrmann*
ATTORNEY

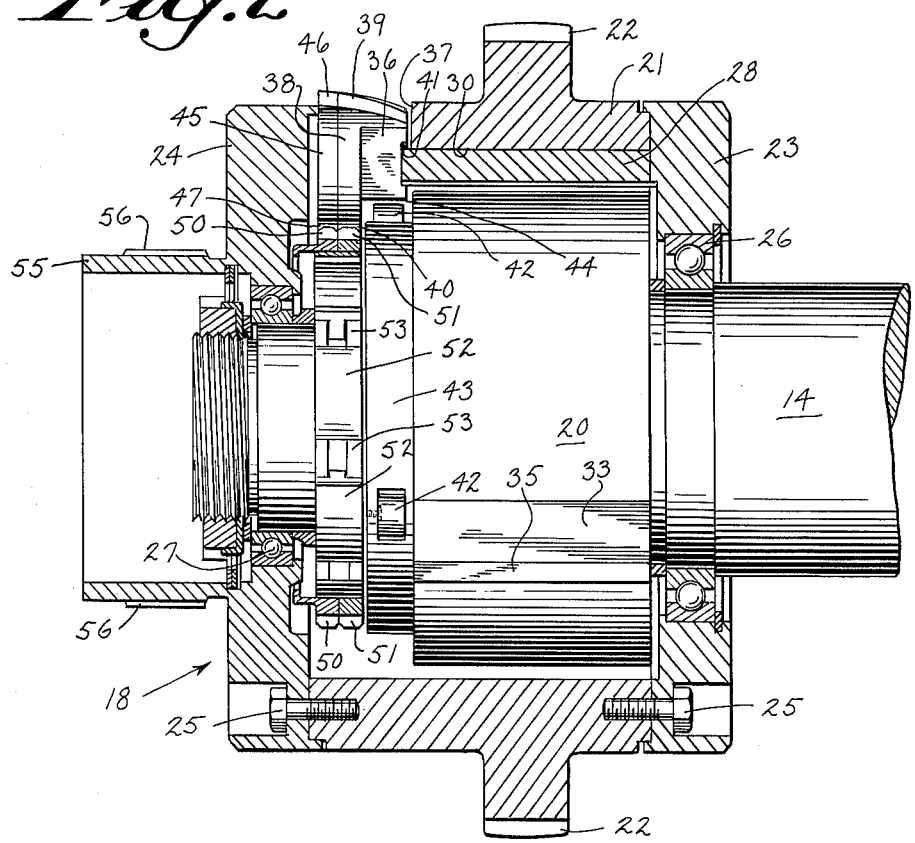
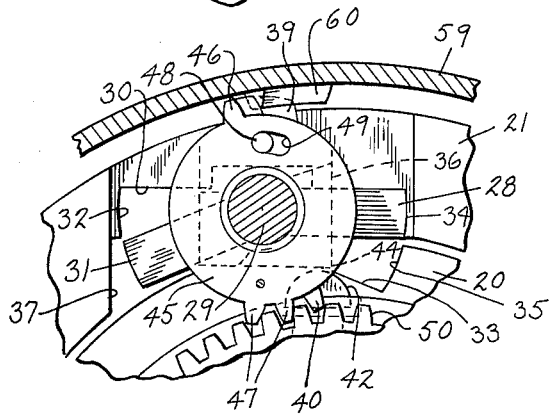
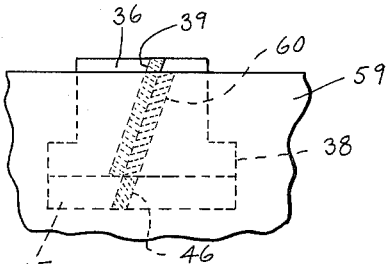
INVENTOR
WILLIAM S. RICHARDSON
BY Thomas W. Ehrmann
ATTORNEY

INVENTOR
WILLIAM S. RICHARDSON

BY *Thomas W. Ehrmann*

ATTORNEY

3,246,726
OVERRUNNING CLUTCH
William S. Richardson, Fox Point, Wis., assignor to The Falk Corporation, Milwaukee, Wis., a corporation of Wisconsin
Filed Feb. 24, 1964, Ser. No. 346,702
12 Claims. (Cl. 192—47)

This invention relates to overrunning clutches, and particularly to an overrunning clutch for connecting a drive shaft of a prime mover to the driven shaft of an externally driven load, which clutch automatically engages when the drive shaft speed reaches synchronization with the driven shaft speed and automatically disengages for overruning when the drive shaft speed falls below synchronous speed. The invention further resides in such a clutch together with means to disengage and lock the clutch out of engagement when the externally driven load reverses direction and to prevent release of such lock-out until the driven shaft resumes normal rotation at a speed in excess of the speed of the drive shaft.

In certain applications, such as some forms of marine drives, an auxiliary power source is used in conjunction with a main power source with the auxiliary power source being used to supply extra power when desired. Specifically, the main power source is a reversing prime mover which may be either a steam turbine, a Diesel engine, or an electric motor. The main power source in marine applications is coupled to reduction gearing connected to the propeller and is used for partial ahead power, maneuvering, and astern operations with reversed propeller rotation. The auxiliary power source is normally a gas turbine which provides high speed operation and which by its very nature is nonreversing. The gas turbine is also coupled to the reduction gearing and is used for extra power up to a maximum in the ahead direction only. Thus, means must be provided which connect the nonreversing gas turbine to the propeller reduction gearing when the marine drive is driving in the ahead direction and which disconnect the nonreversing gas turbine when the drive is operating in the astern direction. The clutch of this invention performs such a function.

The operation of an overrunning clutch in such an application is subject to a number of different and seemingly conflicting criteria. First, when the propeller is being driven in the ahead direction by the main power source alone and it is then desired to increase the speed of the propeller by adding the power of the auxiliary power source, the overrunning clutch should not connect the nonreversing gas turbine to the propeller reduction gearing until the gas turbine has been brought up to the speed of the reduction gearing. If the nonreversing gas turbine were connected to the reduction gearing before the gas turbine had been brought up to synchronous speed, the result would be the action of a drag upon the reduction gear or damage to the gas turbine. Additionally, the clutch must not permit the speed of the nonreversing gas turbine to exceed that of the reduction gearing before engaging. If the gas turbine were connected while running faster than the reduction gearing inertia shock loading would occur, damaging the turbine, the clutch, or the gearing. The overrunning clutch of this invention automatically engages for positive drive when the speed of the gas turbine reaches synchronous speed with that of a propeller reduction gearing and automatically disengages when the speed of the reduction gearing is greater than that of the gas turbine.

Secondly, when the propeller shaft is being driven in the astern direction by the main power source, the auxiliary gas turbine cannot be connected to the propeller reduction gearing since it would be driven in a reverse direction and result in damage to the gas turbine. To positively prevent reverse driving of the gas turbine, the clutch of this invention is locked out of engagement during estern operation or, if desired, for idling of the gas turbine at any speed irrespective of the propeller shaft rotation or speed. Additionally, when shifting from astern to ahead rotation of the propeller, the clutch remains locked out of engagement until the propeller reduction gearing speed is synchronous with or in excess of the gas turbine speed.

Accordingly, it is an object of this invention to provide an overruning clutch interconnecting a nonreversible drive shaft of a prime mover and a reversible driven shaft of an externally rotated load which automatically engages for positive drive when the drive shaft speed is in synchronism with the speed of the driven shaft and automatically disengages for overrunning whenever the speed of the driven shaft is greater than that of the drive shaft.

It is a further object of this invention to provide such an overrunning clutch which is locked out of engagement when the driven shaft is rotated in the direction opposite to that of the nonreversible drive shaft, or for idling of the prime mover, and which will not thereafter reengage until the driven shaft is rotated in the same direction as that of the nonreversing drive shaft, and its speed is at least synchronous with the speed of the drive shaft.

It is another object of this invention to provide such an overrunning clutch of simple construction having rugged interconnecting driving elements between the drive shaft and the driven shaft, and positive means to actuate the driving elements during engagement.

The foregoing and other objects will appear in the description to follow. In the description, reference is made to the accompanying drawings which form a part hereof and in which there is shown by way of illustration a specific embodiment in which this invention may be practiced. This embodiment will be described in sufficient detail to enable those skilled in the art to practice this invention, but it is to be understood that other embodiments of the invention may be used and that structural changes may be made in the embodiment described without departing from the scope of the invention. Consequently, the following detailed description is not to be taken in a limiting sense; instead, the scope of the present invention is best defined by the appended claims.

In the drawings:

FIG. 1 is a generally schematic plan view of one embodiment of a drive incorporating the overrunning clutch of this invention;

FIG. 2 is a view in vertical section through the clutch of this invention with portions thereof shown in side elevation;

FIG. 3 is a view in vertical section taken in the plane of lines 3—3 of FIG. 4;

FIG. 8 is a view similar to FIG. 6 but showing the operating elements as they appear when the clutch is locked-out; and FIG. 9 is a view similar to FIG. 7 but also showing the elements as they appear when the clutch is locked-out.

Figure 4:
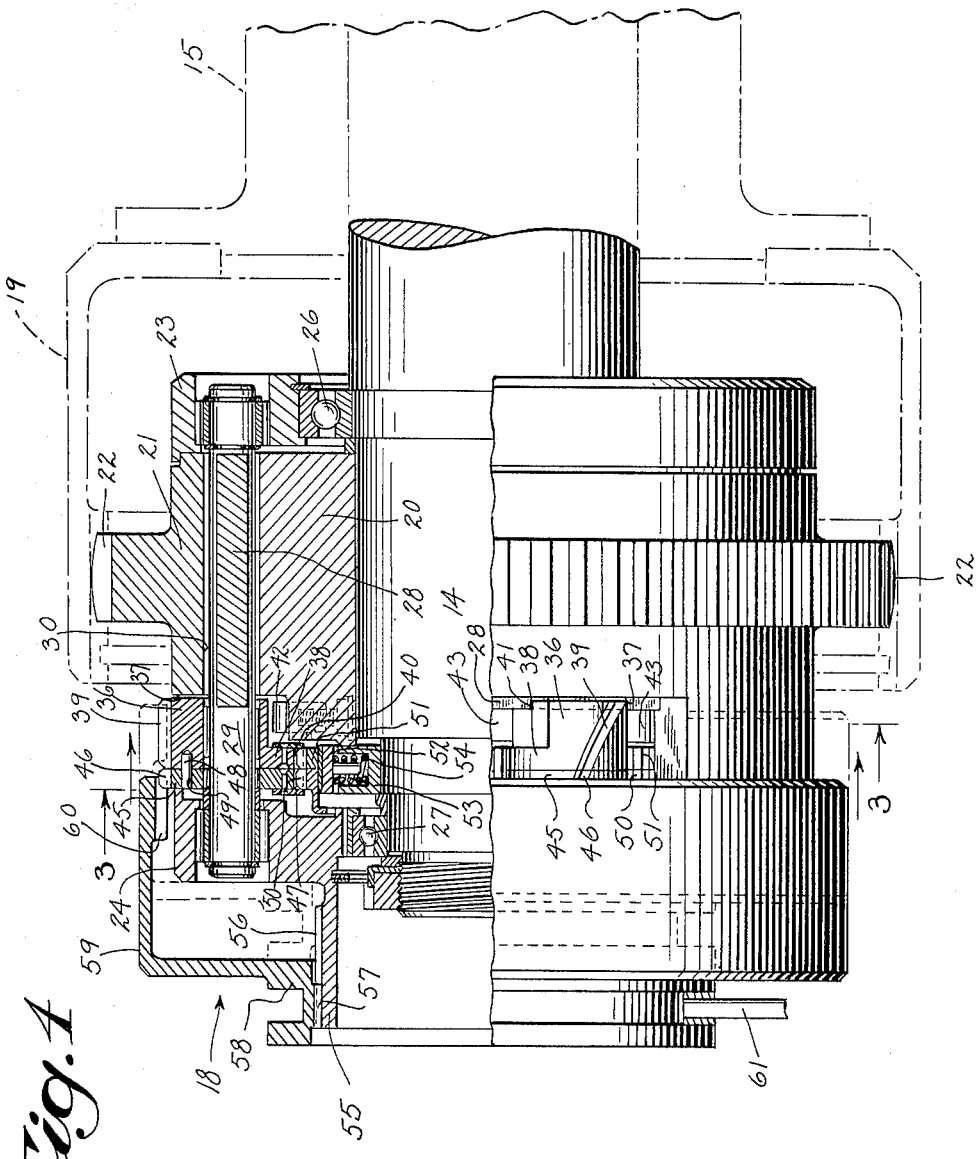
FIG. 4 is a side view in elevation of the clutch with a portion broken away and shown in vertical section.

Referring to FIG. 1, there is shown therein a portion of a marine drive arrangement for the use of the clutch of this invention. A nonreversing gas turbine 10 has its output shaft 11 mounting an internally toothed coupling sleeve 12. A mating externally toothed coupling hub 13 is secured to a shaft 14 which extends through a hollow shaft 15 that mounts a driving pinion 16 and is supported on pinion bearings 17. The shaft 14 further mounts the clutch coupling of this invention designated generally by the numeral 18 and the clutch coupling 18 has external teeth on its periphery meshing with the teeth of an internally toothed coupling sleeve 19 secured to the hollow pinion shaft 15.

The pinion 16 may be one of a pair of pinions driving a bull gear of reduction gearing for a propeller shaft. The other pinion would be driven by a main power source (not shown). The clutch 18 is adapted to selectively engage and disengage so that upon engagement torque will be transmitted from the turbine shaft 11 to the shaft 14 and thence through the clutch 18 to the pinion shaft 15. During disengagement of the clutch coupling 18, the pinion shaft 15 is not driven by the shaft 14.

Referring to FIGS. 2, 3 and 4, an inner hub 20 is fitted and keyed to the shaft 14. An outer hub 21 which includes external dental coupling teeth 22 envelopes and is spaced from the inner hub 20. An inner end plate 23 and an outer end plate 24 are each secured to the outer hub 21 by cap screws 25, and the end plates 23 and 24 are supported on ball bearings 26 and 27, respectively, for free rotation of the outer hub 21 and end plates 23 and 24 upon the shaft 14.

Figure 5:
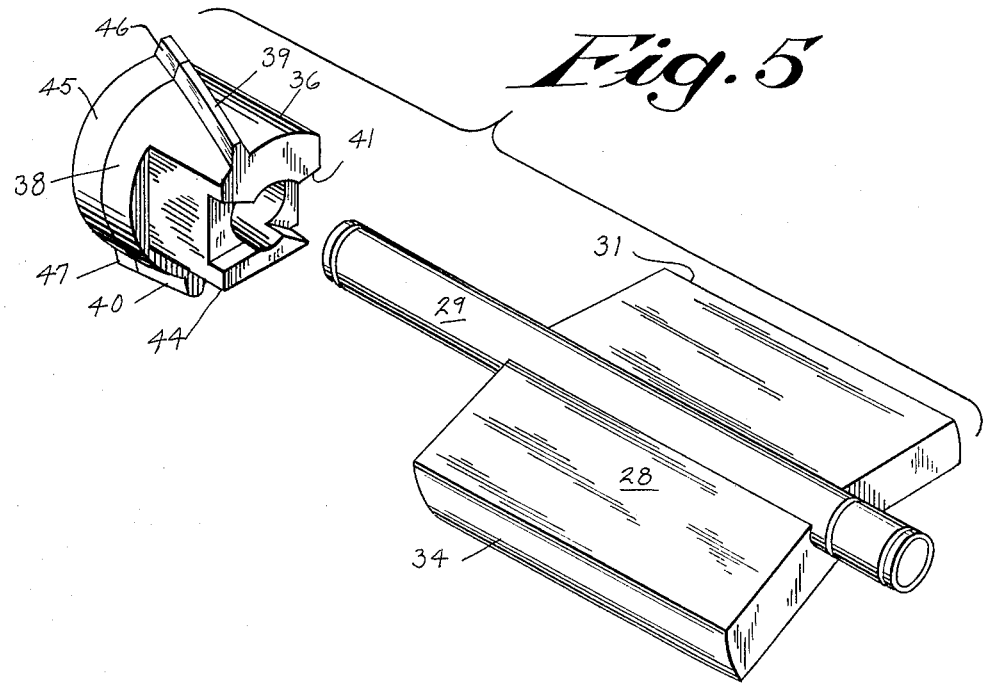
FIG. 5 is an exploded view in perspective of a drive plate cam and drive plate of the clutch.

Three identical generally rectangular drive plates 28 are each formed integral with a drive plate shaft 29 and are slightly bent as shown in FIG. 3 at their junction with the shafts 29. The drive plate shafts 29 are journaled at their ends in needle bearings carried by the end plates 23 and 24 in equally circumferentially spaced bores. The drive plate shafts 29 are, therefore, free to rotate and the integrally mounted drive plates 28 may assume two positions. In a disengaged position, each drive plate 28 is completely contained within a milled recess 30 in the inner periphery of the outer hub 21. When pivoted to an engaged position, a leading edge 31 of the drive plates 28 engages a mating retreating abutment face 32 of the recess 30 and the other end of the drive plate 28 drops down into driving relationship in a matching milled recess 33 in the inner hub 20 with a trailing edge 34 mating with an advancing abutment face 35 of the recess 33. There are three such milled recesses 33 in the inner hub 20, one for each of the drive plates 28. Mounted on each drive plate shaft 29, also on needle bearings, is an actuating cam 36. The outer hub 21 is provided with three generally radial openings 37 to accommodate the actuating cams 36. As may best be seen in FIG. 5, the actuating cams 36 are of generally square cross section except for a disc portion 38 at their outer end and which flows into a cylindrical upper surface. The upper surface of each cam 36 is provided with an integral helical gear tooth 39 upon its outer periphery and the disc portion 38 has a pair of depending spur gear teeth 40. Radial tapered slots 41 in the inner ends of the cams 36 fit over the ends of the drive plates 28, keying the cams 36 to the plates 28 with a few degrees of lost motion to permit the cams 36 to be rotated several degrees more than the drive plates 28.

Three spring loaded detent dogs 42 are equally spaced about a reduced diameter portion 43 of the inner hub 20. When the actuating cams 36 are rotated through a few degrees in the direction which would carry the drive plates 38 to engaging position, a corner 44 of each cam 36 drops radially into position to be contacted by one of the spring loaded detent dogs 42. When the dogs 42 contact the cams 36, any further slight relative rotation of the inner hub 20 with respect to the outer hub 21 forces the cams 36 to pivot the drive plates 28 into engaging position. The spring loading of the dogs 42 insures that all three dogs 42 function equally and that the driving plates 28 bottom in the milled recesses 30 and 33 of the outer and inner hubs 21 and 20, respectively, before being subjected to the drive load.

Three small disc gears 45 are mounted on the drive plate shafts 29 in face-to-face relationship with the cams 36. The disc gears 45 are each mounted on needle bearings carried by the shafts 29. Each disc gear 45 has a helical gear tooth 46 on its upper periphery which can act as an extension of the helical gear tooth 39 of the actuating cam 36. Each disc gear 45 also has a pair of spur gear teeth 47 depending from its lower periphery. Thus, the disc gears 45 have a diameter, a face, and teeth matching those of a disc portion 38 of the actuating cams 36. The disc gears 45 are free to rotate on the drive plate shafts 29 and are keyed to a respective cam 36 by a pin 48 secured to the cam 36 and projecting through a circumferentially elongated slot 49 in the disc gear 45. The dimensions of the slots 49 are such that the helical teeth of the disc gears 45 may either form an extension of the helical teeth 39 of the cam 36 or be out of phase by one-half of their circular pitch.

The spur gear teeth 40 of the three disc gears 45 mesh with a central sun gear 50 in a timed relationship. Similarly, the three actuating cams 36 and their corresponding drive plates 28 are tied together to act in unison by a duplicate sun gear 51 which meshes with the spur gear teeth 40 of the cams 36. The inner peripheral surface of both sun gears 50 and 51 are in frictional contact with eight small babbitted shoes 52. The shoes 52 are mounted on and driven by a spacer ring 53 which is fitted on and keyed to the shaft 14. Initial bearing load between the babbitted surfaces of the shoes 52 and the sun gears 50 and 51 of, for example, 30 p.s.i. is provided by radial springs 54 as supplemented by centrifugal force in proportion to the rotational speed of the shoes 52.

The outer end plate 24 is provided with an outwardly projecting sleeve 55 having axially directed external splines 56. The external splines 56 engage internal splines 57 in a reduced diameter portion 58 of an axially slidable internal ring gear 59 which, therefore, rotates with the outer hub 21 in fixed phase relationship. When the internal ring gear 59 is moved axially inward to assume the dotted line position shown in FIG. 4, a three spaced internal helical gear teeth 60 on the ring gear 59 mesh with the single tooth 39 on each of the three actuating cams 36. The position, helix angle, and face width of the internal helical teeth 60 are arranged so that at full inward travel of the ring gear 59 full contact over the length of the external helical gear teeth 39 of the cams 36 exists.

The ring gear 59 functions as a lock-out device. Movement of the ring gear 59 may be accomplished by any suitable control means. In the embodiment shown, a yoke 61 is engaged about the reduced diameter portion 58 of the ring gear 59 and is spring biased towards disengaged position. The yoke 61 is actuated to cause the ring gear 59 to move axially inwardly by the application of pressure to a pair of hydraulic cylinders 62.

The operation of the overrunning clutch is as follows:

The clutch 18 is arranged upon the shaft 14 for counterclockwise rotation of the shaft 14, as viewed in FIG. 3, and this is also the direction of rotation of the nonreversing gas turbine 10. Assume first that the pinion 16 is also being rotated in a counterclockwise direction by the driving of its meshing bull gear by the main power source. This circumstance approximates that of an ahead direction of rotation of the propeller in a marine drive. If further power is desired in the ahead direction, the gas turbine 10 may be engaged to drive the propeller shaft. However, the gas turbine 10 should not drive the pinion 16 until the speed of the turbine shaft 11 becomes equal to that of the pinion 16, or stated another way, until the speed of the inner hub 20 becomes equal to the speed of the outer hub 21. Where the gas turbine 10 to be connected to the pinion 16 when the pinion speed is greater than the gas turbine speed, power would be consumed in accelerating the gas turbine and this power would be lost to the propeller.

When the propeller is being driven in the ahead direction, the shiftable ring gear 59 is retracted so that its internal helical teeth 60 overlie only the helical teeth 46 of the disc gears 45. This is the solid line position shown in FIG. 4. If the speed of the outer hub 21 is substantially greater than that of the inner hub 20, the drive plates 28 will assume their disengaged position shown in FIG. 3. This may come about either by the drive plates 28 riding up the inclined surfaces of the milled recesses 33 in the inner hub 20 or by the friction drag of the sun gears 50 and 51 on the bearing shoes 52. That is, the difference in speed between the inner hub 20 and the outer hub 21 will develop a friction drag between the sun gears 50 and 51 and the babbitted surfaces of the shoes 52. This friction drag will tend to retard the spur gear teeth 40 of the cams 36 to cause the cams 36 to rotate in a counterclockwise direction as viewed in FIG. 3 and thereby shift the drive plates 28 to their disengaged position. The friction drag will also cause the disc gears 45 to be rotated counterclockwise to the greatest extent permitted by the pins 48. Under such conditions, the driving plates 28 are clear of contact with any part of the inner hub 20 and the gas turbine 10 does not drive the pinion 16.

Figure 6:
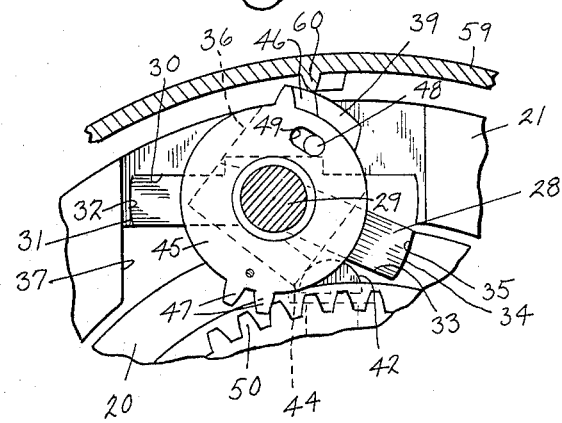
FIG. 6 is an enlarged view of a portion of FIG. 3 showing operating elements as they appear when the clutch is engaged.
Figure 7:
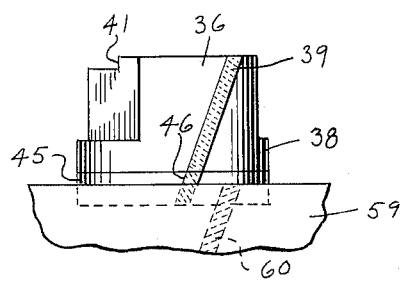
FIG. 7 is a genarally schematic plan view of a cam, disc gear, and ring gear of the clutch as they appear when the clutch is engaged and illustrating cooperating helical gear teeth in a section taken through their pitch lines.

As the gas turbine 10 is brought up to speed to match the existing speed of the pinion 16, the above conditions are unaffected until the speed of the pinion 16 and the turbine shaft 11 are the same at which time the friction force between the sun gears 50 and 51 and the shoes 52 will be zero. With any phase advance of the turbine shaft 11 with respect to the pinion 16, the friction force will reverse in direction and the disc gears 45 and cams 36 will tend to be accelerated. That is, the disc gears 45 and cams 36 will be pivoted in a clockwise direction as viewed in FIG. 3 thereby causing each cam 36 to be placed in a position in which it can be engaged by a dog 42 when the next succeeding dog 42 rotates around to contact the corner 44 of the cam 36. To this time, the lost motion provided by the dimensions of the radial slots 41 will prevent shifting of the driving plates 28. However, when the succeeding dog 42 engages the shifted cam 36, each cam 36 will be rotated to its extreme position thereby carrying each drive plate 28 into its engaging position. The driving plates 28 are bottomed in the hub recesses just before the driving force is applied to the plates 28. The outer hub 21 is thereafter driven at the same speed as the inner hub 20 through the three drive plates 28, and the pinion 16 will be driven at the same speed as the turbine shaft 11 through the meshing dental coupling teeth 22 on the outer hub 21 and the internally toothed coupling sleeve 19. The driving torque is transmitted by compressive load across the full width of the drive plates 28. The engaged position of the drive plates 28 and the corresponding positions of the disc gears 45 and cams 36 for a head operation are shown in FIG. 6. The relative positions of the helical gear teeth 39 and 46 of the cams 36 and disc gears 45, respectively, and of the helical gear teeth 60 of the ring gear 59 are illustrated in FIG. 7.

Should the pinion speed increase beyond the speed of the turbine shaft at any time, the clutch will automatically disengage since the friction forces will reverse and a friction drag will rotate the cams 36 counterclockwise as the dogs 42 recede and again shift the driven plates 28 to their disengaged position.

Assume now that it is desired to rotate the pinion 16 in a direction opposite to that of the turbine shaft 11. This could result from a shaft from ahead to astern operation of the propeller. Obviously the turbine shaft 11 cannot be connected to the pinion 16 in this situation since it would cause the gas turbine 10 to reverse with resulting damage to the gas turbine 10. Therefore, before reversing the direction of rotation of the pinion 16, the lock-out is actuated. That is, the ring gear 59 is shifted axially inwardly into full engagement with the cams 36 and disc gears 45. The three helical teeth 60 of the ring gear 59 will engage the complementary helical teeth 39 and 46 of the cams 36 and the disc gears 45, respectively, and since the ring gear 59 is shifted axially without any relative radial movement the cams 36 and disc gears 45 will be forced to assume an attitude which shifts the drive plates 28 to their disengaged position. Thus, with the ring gear 59 engaged, the cams 36 and drive plates 28 cannot pivot even though a frictional force is developed between the sun gears 50 and 51 and the shoes 52 which would otherwise tend to rotate the cams 36 because of the differences in the direction of rotation of the inner hub 20 and th outer hub 21.

After the ring gear 59 reaches full inward travel, the rotation of the outer hub 21 in a clockwise direction as viewed in FIG. 3 will cause the disc gears 45 to index with respect to the cams 36 by one-half the circular pitch of the helical teeth 39, 46 and 60. This has the effect of causing the helical teeth 46 of the disc gears 45 to assume a position behind the ring gear teeth 60 and thereby the ring gear 59 is prevented from moving axially outwardly from engagement with the helical teeth 39 of the cams 36. The relative positions of the cams 36, disc gears 45, and drive plates 28 when locked out are shown in FIG. 8. The relative positions of the helical gear teeth of the cams 36, disc gears 45, and ring gear 59 are illustrated in FIG. 9. The operation of the lock-out is the same whether the astern manipulation is made from a stationary condition of the propeller shaft or from an ahead-to-astern maneuver. However, in the latter case the clutch hesitates until the propeller slip and torque fall, reducing the friction forces between the edges 31 and 34 of the plates 78 and the abutments 32 and 35 of the hubs 21 and 20, respectively, to a value which can be overcome by the ring gear actuators 62, it being understood that application of astern power is delayed until the clutch lock-out has been effected.

If desired, the lock-out in the form of the shiftable ring gear 59 can also be used to permit idling of the gas turbine 10 with the turbine shaft 11 operating at any speed. The clutch and lock-out functions will be the same as for rotation of the pinion 16 in a direction opposite to that of the gas turbine 10, as above described.

Should it now be desired to again reverse the direction of rotation of the pinion 16 as by a movement from astern-to-ahead, the lock-out will automatically disengage by release of the actuators 62 but this disengagement will not occur until the speed of the outer hub 21 in the ahead direction exceeds that of the inner hub 20. As above noted, the helical teeth 46 of the disc gears 45 are positioned behind the ring gear teeth 60. It is necessary, therefore, to pivot the disc gears 45 counterclockwise as viewed in FIG. 3 to permit the withdrawal of the ring gear 59 and this can be accomplished only by the development of a suitable frictional force between the sun gears 50 and 51 and the shoes 52. When the speed of the outer hub 21 in a counterclockwise direction exceeds the speed of the inner hub 20, the frictional forces created will rotate the disc gears 45 in a counterclockwise direction as viewed in FIG. 3 independently of the held cam 36 to again align the helical teeth 46 of the disc gears 45 with the helical teeth 39 of the cams 36. The ring gear 59 is then permitted of slide axially outwardly of engagement with the cams 36. Since the clutch is now overrunning, the clutch remains disengaged until the gas turbine speed is again brought up to synchronization with the speed of the pinion 16.

I claim:

1. In a clutch for connecting a drive shaft to an externally driven shaft, the combination comprising: an inner hub mountable on one of said shafts for rotation therewith; a hollow outer hub adapted to be supported for independent rotation upon said one of said shafts and to be disposed about said inner hub and radially spaced therefrom, said outer hub being drivingly connectable to the other of said shafts; a drive plate supported in the space between said inner and outer hubs for movement with said driven shaft and being shiftable between a disengaged position and an engaged position connecting said hubs; said inner and outer hubs having recesses in their respective outer and inner peripheries which are adapted to receive said drive plate when the same is shifted to said engaged position whereby said drive plate forms a driving connection between said shafts when in said engaged position; a cam member rotatably mounted with said drive plate and having radially extending gear teeth, said cam member engaging said drive plate to shift said drive plate when said cam member is rotated; a gear meshing with said gear teeth of said cam member; and means drivingly connectable to said drive shaft and frictionally engaging said gear to have said gear tend to rotate said cam member, said gear rotating said cam members to one position in which said cam member holds said drive plate in said disengaged position when the speed of said driven shaft is relatively greater than the speed of said drive shaft, and said gear rotating said cam member to an opposite position in which said cam member shifts said drive plate to said engaged position when the speed of said drive shaft is relatively greater than the speed of said driven shaft.

2. In an overrunning clutch for connecting a unidirectional drive shaft to an externally driven shaft, the combination comprising: an inner hub mountable on said drive shaft for rotation therewith; a hollow outer hub drivingly connectable to said driven shaft for rotation therewith and adapted to be supported for independent rotation upon said drive shaft, said outer hub being disposed about said inner hub and radially spaced therefrom; a drive plate supported in the space between said inner and outer hubs for movement with said outer hub and being shiftable between a disengaged position in which said outer hub is free to overrun said inner hub and an engaged position in which said drive plate connects said hubs; said inner and outer hubs having recesses in their respective outer and inner peripheries which receive trailing and leading edges of said drive plate when the same is shifted to said engaged position to drivingly connected said inner and outer hubs; a cam member rotatably mounted with said drive plate and having radially inwardly extending gear teeth, said cam member engaging said drive plate to shift said drive plate when said cam member is rotated; a sun gear meshing with said gear teeth of said cam member; and means mountable on said drive shaft and frictionally engaging said sun gear to have said sun gear tend to rotate said drive plate, said sun gear rotating said cam member to one position in which said cam member holds said drive plate in said disengaged position when the speed of said outer hub is relatively greater than the speed of said inner hub, and said sun gear rotating said cam member to an opposite position in which said cam member shifts said drive plate to said engaged position when the speed of said inner hub is relatively greater than the speed of said outer hub.

3. A clutch in accordance with claim 2 wherein said cam member loosely engages said drive plate to permit independent rotation of said cam member through a limited arc and to have said cam member shift said drive plate when rotated through a greater arc, and said sun gear being advanced relative to said outer hub by said mounting means when the speed of said inner hub is relatively greater than the speed of said outer hub to rotate said cam member through said limited arc, together with cam actuating means on said inner hub that engage said cam member when the same has been rotated through said limited arc to further rotate said cam member through said greater arc and thereby shift said drive plate to said engaged position.

4. In an overrunning clutch for connecting a unidirectional drive shaft to a bidirectional externally driven shaft, the combination comprising: an inner hub mountable on one of said shafts for rotation therewith; a hollow outer hub drivingly connectable to the other of said shafts for rotation therewith and adapted to be supported for independent rotation upon said one of said shafts, said outer hub being disposed about said inner hub and radially spaced therefrom; a drive plate supported in the space between said hubs and being shiftable between a disengaged position and an engaged position connecting said hubs; said inner and outer hubs having recesses in their respective outer and inner peripheries which are adapted to receive trailing and leading edges of said drive plate when the same is shifted to said engaged position; shift means responsive to the difference in speed between said hubs, said shift means being adapted to hold said drive plate in said disengaged position when the speed of the hub connected to said driven shaft is relatively greater than that of the hub connected to said drive shaft and adapted to shift said drive plate to said engaged position as soon as the speed of the hub connected to said drive shaft is relatively greater than that of the hub connected to said driven shaft; and lock-out means to restrain said shift means from shifting said drive plate to said engaged position when the hub connected to said driven shaft is rotated thereby in a direction opposite to the direction of rotation of the hub connected to said unidirectional drive shaft, whereby said drive plate will form a driving connection between said shafts when the drive shaft is in synchronization with the driven shaft and will otherwise be disengaged for overrunning of the clutch.

5. In an overrunning clutch for connecting a unidirectional drive shaft to a bidirectional externally driven shaft, the combination comprising: an inner hub mountable on said drive shaft for rotation therewith and having a plurality of peripherally spaced recesses in its outer surface, each of said recesses including an advancing abutment face; a hollow outer hub adapted for driving connection to said driven shaft, said outer hub having a plurality of peripherally spaced recesses in its inner surface and each recess including a retreating abutment face; a pair of support walls attached to the ends of said outer hub and adapted to be supported for free rotation upon said drive shaft, said outer hub being disposed about and spaced from said inner hub; a plurality of drive plates mounted on spaced, axially extending shafts journaled at their ends in said support walls, said drive plates each being shiftable between an engaged position in which a leading edge of said drive plate mates with said retreating abutment face and a trailing edge of said drive plate mates with said advancing abutment face and a disengaged position in which said inner and outer hubs are unconnected; shift means responsive to the difference in speeds between said hubs, said shift means being adapted to hold said drive plates in said disengaged position when the speed of said outer hub is relatively greater than that of said inner hub and adapted to shift said drive plates to said engaged position when the speed of said inner hub is synchronized with that of said outer hub; and lock-out means to restrain said shift means from shifting said drive plates to said engaged position for rotation of said outer hub by said driven shaft in a direction opposite to the direction of rotation of the inner hub.

6. In an overrunning clutch for connecting a unidirectional drive shaft to a bidirectional externally driven shaft, the combination comprising: an inner hub mountable on said drive shaft for rotation therewith and having a plurality of peripherally spaced recesses in its outer surface; a hollow outer hub adapted for driving connection to said driven shaft and having a plurality of peripherally spaced recesses in its inner surface; support walls attached to the ends of said outer hub and mountable for free rotation upon said drive shaft, said outer hub being disposed about and spaced from said inner hub; a plurality of drive plates mounted on spaced, axially extending shafts journaled at their ends in said support walls, said drive plates each being shiftable between an engaged position in which said drive plates fall within said recesses in said hubs to form a driving connection therebetween and a disengaged position in which said hubs are unconnected; a cam member rotatably mounted on each drive plate shaft and having radially inwardly extending gear teeth, said cam members each engaging a drive plate to shift said drive plate when said cam member is rotated; a sun gear meshing with said gear teeth of said cam member; means mountable on said drive shaft and frictionally engaging said sun gear to have said sun gear tend to rotate said cam members, said sun gear rotating said cam members to one position in which said cam members hold said drive plates in said disengaged position when the speed of said outer hub is relatively greater than the speed of said inner hub, said sun gear rotating said cam members to an opposite position in which said cam members shift said drive plates to said engaged position when the speed of said inner hub is relatively greater than the speed of said outer hub; and lock-out means engageable to lock said cam members in said one position whereby said outer hub may be rotated by said driven shaft in a direction opposite to that of said inner hub without engaging the clutch.

7. In an overrunning clutch for connecting a unidirectional drive shaft to a bidirectional externally driven shaft, the combination comprising: an inner hub mountable on said drive shaft for rotation therewith and having a plurality of peripherally spaced recesses in its outer surface; a hollow outer hub adapted for driving connection to said driven shaft and having a plurality of peripherally spaced recesses in its inner surface; a support wall attached to each end of said outer hub and mountable for free rotation upon said drive shaft, said outer hub being disposed about and spaced from said inner hub; a plurality of drive plates mounted on spaced, axially extending shafts journaled at their ends in said support walls, said drive plates each being shiftable between an engaged position in which said drive plates fall within said recesses in said hubs to form a driving connection therebetween and a disengaged position in which said hubs are unconnected; a cam member rotatably mounted on each drive plate shaft and having radially inwardly extending gear teeth, said cam members each loosely engaging a drive plate to permit independent rotation of said cam member through a limited arc and to have said cam member shift said drive plate when rotated through a greater arc; a sun gear meshing with said gear teeth of said cam members; mounting means frictionally engaging said sun gear and mountable on said drive shaft, said sun gear being retarded relative to said outer hub by said mounting means when the speed of said outer hub is relatively greater than the speed of said inner hub to rotate said cam members to an extreme position in which said cam members engage and hold said drive plates in said disengaged position, said sun gear being advanced relative to said outer hub by said mounting means as soon as the speed of said inner hub is relatively greater than the speed of said outer hub to rotate said cam members from said extreme position through said limited arc; cam actuating means on said inner hub adapted to engage said cam members when the same have been rotated through said limited arc to further rotate said cam members through said greater arc and thereby shift said drive plates to said engaged position; and lock-out means engageable to lock said cam members in said extreme position for reverse rotation of said outer hub by said driven shaft.

8. An overrunning clutch in accordance with claim 7 wherein said mounting means comprises a ring member mountable on said drive shaft for rotation therewith, and a plurality of shoes supported by said ring member and biased radially outwardly to have said shoes yieldably engage the inner peripheral surface of said sun gear.

9. An overrunning clutch in accordance with claim 7 wherein said cam actuating means comprises a plurality of spring loaded dogs mounted at spaced intervals within said inner hub and projecting radially outwardly thereof to be cleared by said cam members when the same are in said extreme position but to fall in the path of travel of said cam members when the same have been rotated through said limited arc.

10. In an overrunning clutch for connecting a unidirectional drive shaft to a bidirectional externally driven shaft, the combiation comprising: an inner hub mountable on said drive shaft for rotation therewith and having a plurality of peripherally spaced recesses in its outer surface; a hollow outer hub adapted for driving connection to said driven shaft and having a plurality of peripherally spaced recesses in its inner surface; support walls attached to the end of said outer hub and mountable for free rotation upon said drive shaft, said outer hub being disposed about and spaced from said inner hub; a plurality of drive plates mounted on spaced, axially extending shafts journaled at their ends in said support walls, said drive plates each being shiftable between an engaged position in which said drive plates fall within said recesses in said hubs to form a driving connection therebetween and a disengaged position in which said hubs are unconnected; a cam member rotatably mounted on each drive plate shaft and having a radially outwardly extending helical gear tooth, said cam members each engaging a drive plate to shift said drive plate when said cam member is rotated; means responsive to the difference in speed between said hubs, said last named means being adapted to rotate said cam members to one position in which said cam members hold said drive plates in said disengaged position when the speed of said outer hub is relatively greater than the speed of said inner hub, said last named means being further adapted to rotate said cam members to an opposite position in which said cam members shift said drive plates to said engaged position when the speed of said inner hub is relatively greater than the speed of said outer hub; and an internal ring gear having an internal helical gear tooth for each cam member, said internal ring gear being mounted for rotation with said outer hub and being axially movable thereon from a retracted position to a locking position in which said internal helical gear teeth mate with said helical gear teeth of said cam members to thereby force said cam members to said one position and permit reverse rotation of said outer hub without engagement of the clutch.

11. In an overrunning clutch for connecting a unidirectional drive shaft to a bidirectional externally driven shaft, the combination comprising: an inner hub mountable on said drive shaft for rotation therewith and having a plurality of peripherally spaced recesses in its outer surface; a hollow outer hub adapted for driving connection to said driven shaft and having a plurality of peripherally spaced recesses in its inner surface; support walls attached to the ends of said outer hub and mountable for free rotation upon said drive shaft, said outer hub being disposed about and spaced from said inner hub; a plurality of drive plates mounted on spaced, axially extending shafts journaled at their ends in said support walls, said drive plates each being shiftable between an engaged position in which said drive plates fall within said recesses in said hubs to form a driving connection therebetween and a disengaged position in which said hubs are unconnected; a cam member rotatably mounted on each drive plate shaft and having a radially outwardly extending helical gear tooth, said cam members each engaging a drive plate to shift said drive plate when said cam member is rotated; a disc gear rotatably mounted on each drive plate shaft and tied to a respective cam member for rotation therewith, said disc gears each having a radially outwardly extending helical gear tooth which normally forms an extension of the helical gear tooth of said cam member, said disc gears being free to rotate independently of said cam members through one-half of the circular pitch of said helical gear teeth; means responsive to the difference in speed between said hubs, said last named means being adapted to rotate said cam members to one position in which said cam members hold said drive plates in said disengaged position when the speed of said outer hub is relatively greater than the speed of said inner hub, said last named means being further adapted to rotate said cam members to an opposite position in which said cam members shift said drive plates to said engaged position when the speed of said inner hub is relatively greater than the speed of said outer hub; and an internal ring gear having an internal helical gear tooth for each cam member, said internal ring gear being mounted for rotation with said outer hub and being axially movable thereon from a retracted position to a locking position in which said internal helical gear teeth mate with said helical gear teeth of said cam members to thereby force said cam members to said one position and permit reverse rotation of said outer hub without engagement of the clutch, said last named means rotating said disc gears independently of said cam members when the speed of said inner hub is relatively greater than the speed of said outer hub under reverse rotation of said outer hub to have the helical gear teeth of said disc gears register with the helical gear teeth of said ring gear and block the withdrawal of said ring gear to said retracted position until the speed of said outer hub is again relatively greater than the speed of said inner hub.

12. In an overrunning clutch for connecting a unidirectional drive shaft to a bidirectional externally driven shaft, the combination comprising: an inner hub mountable on said drive shaft for rotation therewith and having a plurality of peripherally spaced recesses in its outer surface, each of said recesses including an advancing abutment face; a hollow outer hub adapted for driving connection to said driven shaft, said outer hub having a plurality of peripherally spaced recesses in its inner surface and each recess including a retreating abutment face; a pair of support walls attached to the ends of said outer hub and adapted to be supported for free rotation upon said drive shaft, one of said support walls including an axially extending sleeve, said outer hub being disposed about and spaced from said inner hub; a plurality of drive plates mounted on spaced, axially extending shafts journaled at their ends in said support walls, said drive plates each being shiftable between an engaged position in which a leading edge of said drive plate mates with said retreating abutment face and a trailing edge of said drive plate mates with said advancing abutment face and a disengaged position in which said hubs are unconnected; a cam member rotatably mounted on each drive plate shaft, said cam members each having radially inwardly extending gear teeth and a radially outwardly extending helical gear tooth, said cam members each loosely engaging a drive plate to permit independent rotation of said cam members through a limited arc and to have said cam members shift said drive plates when rotated through a greater arc; a disc gear rotatably mounted on each drive plate shaft and tied to a respective cam member for rotation therewith, said disc gears each having radially inwardly extending gear teeth and a radially outwardly extending helical gear tooth which normally forms an extension of the helical gear teeth of said cam member, said disc gears being free to rotate independently of said cam members through one-half of the circular pitch of said helical gear teeth; sun gears meshing with said gear teeth of said cam members and said disc gears; mounting means frictionally engaging said sun gears and mountable on said drive shaft, said sun gears being retarded relative to said outer hub by said mounting means when the speed of said outer hub is relatively greater than the speed of said inner hub to rotate said cam members and disc gears to an extreme position in which said cam members engage and hold said drive plates in said disengaged position, said sun gears being advanced relative to said outer hub by said mounting means whenever the speed of said inner hub is relatively greater than the speed of said outer hub to rotate said cam members from said extreme position through said limited arc; cam actuating means on said inner hub adapted to engage said cam members when the same have been rotated through said limited arc to further rotate said cam members through said greater arc and thereby shift said drive plates to said engaged position; and an internal ring gear having a plurality of internal helical gear teeth, said ring gear being mounted upon said sleeve portion for rotation with said outer hub and being axially movable thereon from a retracted position to a locking position in which said internal helical gear teeth mate with said helical gear teeth of said cam members to thereby force said cam members to said extreme position and permit reverse rotation of said outer hub without engagement of the clutch, said disc gears being rotated independently of said cam members when said sun gears are advanced relative to said outer hub whereby the helical gear teeth of said disc gears register with the helical gear teeth of said ring gear and block the withdrawal of said ring gear to said retracted position until said disc gears are rotated by said sun gears when said sun gears are retarded relative to said outer hub.

References Cited by the Examiner
UNITED STATES PATENTS

| | | | |
|---|---|---|---|
| 1,163,298 | 12/1915 | Winkler | 192—41 |
| 1,396,343 | 11/1921 | Richardson | 192—46 |

FOREIGN PATENTS

| | | |
|---|---|---|
| 745,209 | 2/1933 | France. |
| 1,196,231 | 5/1959 | France. |

DAVID J. WILLIAMOWSKY, *Primary Examiner.*